United States Patent
Natanzon et al.

(10) Patent No.: US 10,747,667 B2
(45) Date of Patent: Aug. 18, 2020

(54) MEMORY MANAGEMENT OF MULTI-LEVEL METADATA CACHE FOR CONTENT-BASED DEDUPLICATED STORAGE

(71) Applicant: EMC IP Holding Company LLC, Hopkinton, MA (US)

(72) Inventors: Assaf Natanzon, Tel Aviv (IL); Amitai Alkalay, Kadima (IL); Zvi Schneider, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/179,295

(22) Filed: Nov. 2, 2018

(65) Prior Publication Data
US 2020/0142830 A1  May 7, 2020

(51) Int. Cl.
*G06F 12/00* (2006.01)
*G06F 12/0811* (2016.01)

(52) U.S. Cl.
CPC .... *G06F 12/0811* (2013.01); *G06F 2212/651* (2013.01)

(58) Field of Classification Search
CPC ......... G06F 12/0811; G06F 2212/1016; G06F 2009/45583; G06F 12/0871; G06F 2212/684
See application file for complete search history.

(56) References Cited

U.S. PATENT DOCUMENTS

| | | | |
|---|---|---|---|
| 7,203,741 B2 | 4/2007 | Marco et al. | |
| 7,719,443 B1 | 5/2010 | Natanzon | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |

(Continued)

OTHER PUBLICATIONS

U.S. Appl. No. 15/656,168, filed Jul. 21, 2017, Hu et al.

(Continued)

*Primary Examiner* — Mano Padmanabhan
*Assistant Examiner* — Mohammad S Hasan
(74) *Attorney, Agent, or Firm* — Daly, Crowley Mofford & Durkee, LLP

(57) ABSTRACT

An aspect of memory management is provided. An aspect includes evaluating performance parameters of caches of a control module. The caches of the control module have two types of entries: address, hash, and physical location values, and address-to-short-hash (A2SH) values. An aspect further includes evaluating performance parameters of caches of a data module of the multi-layer cache system. The caches of the data module cache include three types of entries: a short-hash-to-physical address, a full-hash-and-short-hash-to-physical address, and a filter mechanism. An aspect further includes predicting an effect that a modification to a size of one of the caches o is on performance of operations at the multi-level cache based on results of the calculating the performance parameters of the caches. Upon estimating an increase in performance, an aspect includes increasing allocation to the cache is determined to have increased performance responsive to the estimating, and decreasing allocation from another cache.

18 Claims, 8 Drawing Sheets

(56) References Cited

U.S. PATENT DOCUMENTS

| | | |
|---|---|---|
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,326 B2 * | 8/2015 | Frank ................... G06F 3/061 |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 * | 9/2015 | Natanzon ............ G06F 12/0866 |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,208,162 B1 * | 12/2015 | Hallak ................ G06F 11/2094 |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,106 B1 * | 6/2016 | Ben-Moshe ........ G06F 11/2094 |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,396,243 B1 * | 7/2016 | Halevi ................... G06F 16/27 |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |

(56) References Cited

U.S. PATENT DOCUMENTS

| | | |
|---|---|---|
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Lieberman et al. |
| 10,101,943 B1 | 10/2018 | Ayzenberg et al. |
| 10,108,356 B1 | 10/2018 | Natanzon et al. |
| 10,108,507 B1 | 10/2018 | Natanzon |
| 10,108,645 B1 | 10/2018 | Bigman et al. |
| 10,114,581 B1 | 10/2018 | Natanzon et al. |
| 10,120,787 B1 | 11/2018 | Shemer et al. |
| 10,120,925 B1 | 11/2018 | Natanzon et al. |
| 10,126,946 B1 | 11/2018 | Natanzon et al. |
| 10,133,874 B1 | 11/2018 | Natanzon et al. |
| 10,140,039 B1 | 11/2018 | Baruch et al. |
| 10,146,436 B1 | 12/2018 | Natanzon et al. |
| 10,146,639 B1 | 12/2018 | Natanzon et al. |
| 10,146,675 B1 | 12/2018 | Shemer et al. |
| 10,146,961 B1 | 12/2018 | Baruch et al. |
| 10,148,751 B1 | 12/2018 | Natanzon |
| 10,152,246 B1 | 12/2018 | Lieberman et al. |
| 10,152,267 B1 | 12/2018 | Ayzenberg et al. |
| 10,152,384 B1 | 12/2018 | Amit et al. |
| 10,157,014 B1 | 12/2018 | Panidis et al. |
| 10,185,583 B1 | 1/2019 | Natanzon et al. |
| 10,191,677 B1 | 1/2019 | Natanzon et al. |
| 10,191,687 B1 | 1/2019 | Baruch et al. |
| 10,191,755 B1 | 1/2019 | Natanzon et al. |
| 10,203,904 B1 | 2/2019 | Natanzon et al. |
| 10,210,073 B1 | 2/2019 | Baruch et al. |
| 10,223,007 B1 | 3/2019 | Natanzon et al. |
| 10,223,023 B1 | 3/2019 | Natanzon et al. |
| 10,223,131 B1 | 3/2019 | Lieberman et al. |
| 10,229,006 B1 | 3/2019 | Natanzon et al. |
| 10,229,056 B1 | 3/2019 | Panidis et al. |
| 10,268,656 B1 * | 4/2019 | Cheng ................. G06F 16/9566 |
| 10,366,011 B1 * | 7/2019 | Schneider ........... G06F 12/0811 |
| 2011/0307659 A1 * | 12/2011 | Hans .................... G06F 3/0613 711/114 |
| 2013/0227051 A1 * | 8/2013 | Khakpour ........... H04L 67/2842 709/213 |
| 2016/0147446 A1 * | 5/2016 | Ghosh .................... G06F 3/061 711/103 |
| 2017/0185326 A1 * | 6/2017 | Meiri .................... G06F 3/0619 |
| 2018/0189631 A1 * | 7/2018 | Sumbul .................... G06N 3/04 |

OTHER PUBLICATIONS

U.S. Appl. No. 14/496,783, filed Sep. 25, 2014, Natanzon et al.
U.S. Appl. No. 14/496,790, filed Sep. 25, 2014, Cohen et al.
U.S. Appl. No. 14/559,036, filed Dec. 3, 2014, Natanzon et al.
U.S. Appl. No. 14/753,389, filed Jun. 29, 2015, Nir et al.
U.S. Appl. No. 14/976,719, filed Dec. 21, 2015, Natanzon.
U.S. Appl. No. 14/978,378, filed Dec. 22, 2015, Bigman et al.
U.S. Appl. No. 15/085,148, filed Mar. 30, 2016, Baruch et al.
U.S. Appl. No. 15/274,362, filed Sep. 23, 2016, Baruch et al.
U.S. Appl. No. 15/275,768, filed Sep. 26, 2016, Natanzon et al.
U.S. Appl. No. 15/275,756, filed Sep. 26, 2016, Natanzon et al.
U.S. Appl. No. 15/379,940, filed Dec. 15, 2016, Baruch et al.
U.S. Appl. No. 15/386,754, filed Dec. 21, 2016, Shemer et al.
U.S. Appl. No. 15/380,013, filed Dec. 15, 2016, Baruch et al.
U.S. Appl. No. 15/390,996, filed Dec. 27, 2016, Natanzon et al.
U.S. Appl. No. 15/391,030, filed Dec. 27, 2016, Shemer et al.
U.S. Appl. No. 15/970,243, filed May 3, 2018, Schneider et al.
U.S. Appl. No. 16/052,037, filed Aug. 1, 2018, Schneider et al.
U.S. Appl. No. 16/048,763, filed Jul. 30, 2018, Schneider at al.
U.S. Appl. No. 16/050,400, filed Jul. 31, 2018, Alkalay et al.
U.S. Appl. No. 16/261,174, filed Jan. 29, 2019, Natanzon et al.

* cited by examiner

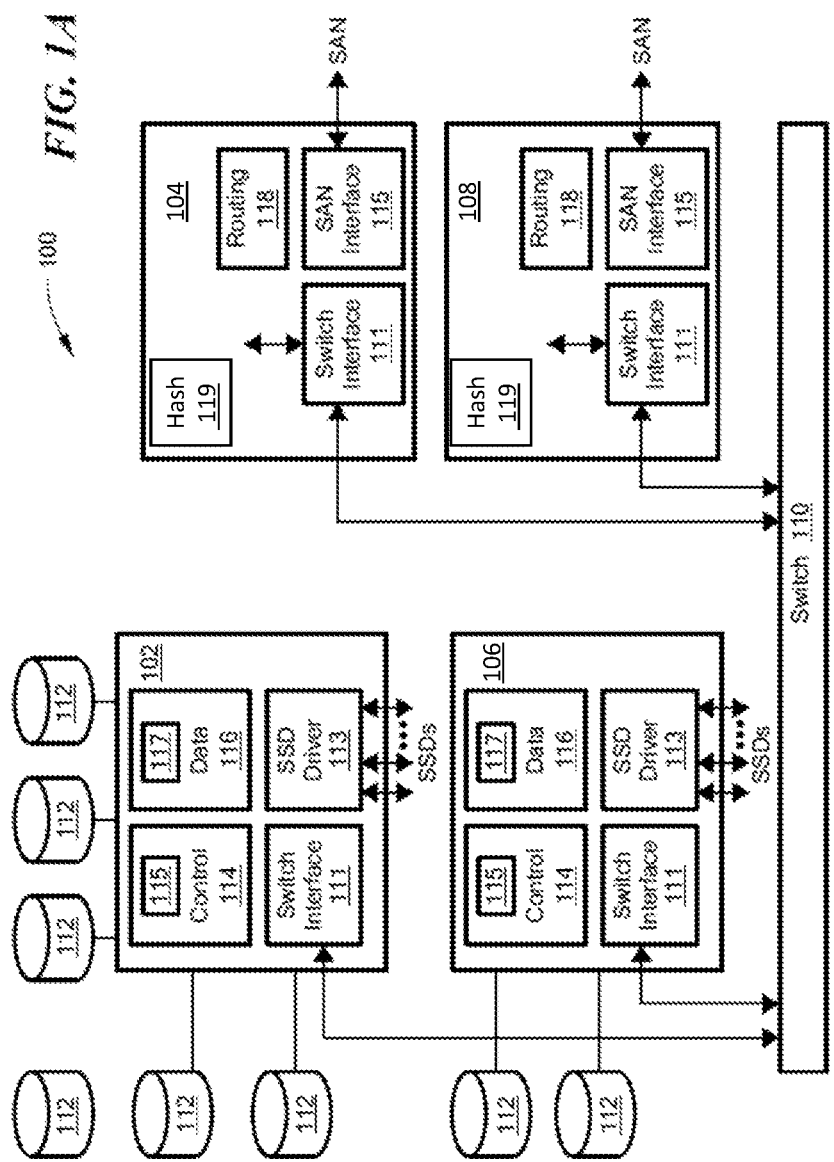

MEMORY MANAGEMENT OF MULTI-LEVEL METADATA CACHE FOR CONTENT-BASED DEDUPLICATED STORAGE

BACKGROUND

Modern storage systems leverage flash drives to provide fast, reliable deduplicated storage. Many of the systems keep the metadata for the system in memory to avoid accesses to the slower flash device. However, keeping metadata on the disk requires at least one more access to the flash device, and in some cases multiple accesses to the flash device, which can significantly reduce the overall performance of the read operations.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method to provide memory management of deduplicated storage having a multi-level cache system. The method includes evaluating performance parameters of caches of a control module of the multi-layer cache system. The caches of the control module include two types of entries: address, hash, and physical location values, and address-to-short-hash (A2SH) values. The method also includes evaluating performance parameters of caches of a data module of the multi-layer cache system. The caches of the data module cache include three types of entries: a short-hash-to-physical address, a full-hash-and-short-hash-to-physical address, and a filter mechanism. The filter mechanism is configured to determine whether a hash value for a write operation exists. The method further includes predicting an effect that a modification to a size of one of the caches of the control module and the data module is on performance of operations at the multi-level cache based on results of the calculating the performance parameters of the caches of the control module and the caches of the data module. Upon estimating an increase in performance of one of the caches of the control module and the caches of the data module, the method includes repartitioning memory to increase allocation to the one of the caches that is determined to have increased performance responsive to the estimating, and repartitioning memory to decrease allocation from another of the caches.

Another aspect may provide a system for providing memory management of deduplicated storage having a multi-level metadata cache system. The system includes a memory having computer-executable instructions. The system also includes a processor operated by a storage system. The processor executes the computer-executable instructions. When executed by the processor, the computer-executable instructions cause the processor to perform operations. The operations include evaluating performance parameters of caches of a control module of the multi-layer cache system. The caches of the control module include two types of entries: address, hash, and physical location values, and address-to-short-hash (A2SH) values. The operations also include evaluating performance parameters of caches of a data module of the multi-layer cache system. The caches of the data module cache include three types of entries: a short-hash-to-physical address, a full-hash-and-short-hash-to-physical address, and a filter mechanism. The filter mechanism is configured to determine whether a hash value for a write operation exists. The operations further include predicting an effect that a modification to a size of one of the caches of the control module and the data module is on performance of operations at the multi-level cache based on results of the calculating the performance parameters of the caches of the control module and the caches of the data module. Upon estimating an increase in performance of one of the caches of the control module and the caches of the data module, the operations also include repartitioning memory to increase allocation to the one of the caches that is determined to have increased performance responsive to the estimating, and repartitioning memory to decrease allocation from another of the caches.

Another aspect may provide a computer program product embodied on a non-transitory computer readable medium. The computer program product provides memory management of deduplicated storage having a multi-level metadata cache system. The computer program product includes instructions that, when executed by a computer at a storage system, causes the computer to perform operations. The operations include evaluating performance parameters of caches of a control module of the multi-layer cache system. The caches of the control module include two types of entries: address, hash, and physical location values, and address-to-short-hash (A2SH) values. The operations also include evaluating performance parameters of caches of a data module of the multi-layer cache system. The caches of the data module cache include three types of entries: a short-hash-to-physical address, a full-hash-and-short-hash-to-physical address, and a filter mechanism. The filter mechanism is configured to determine whether a hash value for a write operation exists. The operations further include predicting an effect that a modification to a size of one of the caches of the control module and the data module is on performance of operations at the multi-level cache based on results of the calculating the performance parameters of the caches of the control module and the caches of the data module. Upon estimating an increase in performance of one of the caches of the control module and the caches of the data module, the operations also include repartitioning memory to increase allocation to the one of the caches that is determined to have increased performance responsive to the estimating, and repartitioning memory to decrease allocation from another of the caches.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 1A is a block diagram of a content-based storage system having multi-level cache for deduplicated storage for providing online iterative data verification for synchronous replication in an embodiment in accordance with an embodiment;

DETAILED DESCRIPTION

Figure 1B:
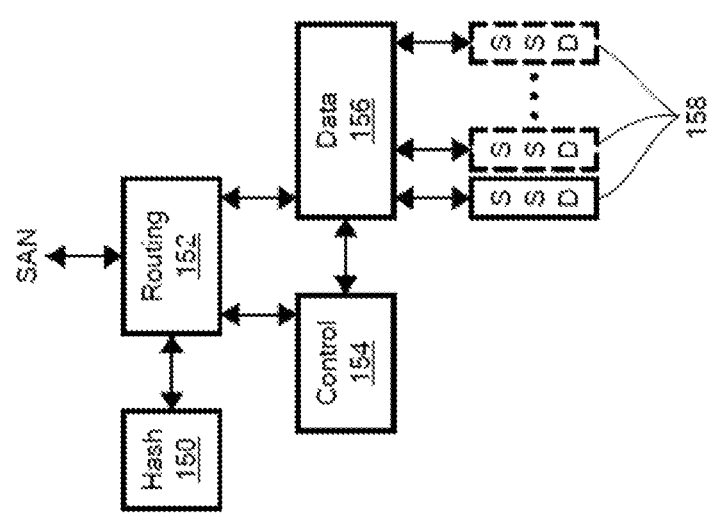
FIG. 1B illustrates further detail of the system of FIG. 1A.

Embodiments described herein provide memory management of multi-level metadata cache for content-based storage. The memory management techniques provide enhancements to a multi-level cache system (e.g., a control module cache and a data module cache), as well as a process for dynamically adjusting memory of the cache system based on performance parameters identified during operation. In embodiments, a process evaluates the evaluating performance parameters of the caches. The process predicts effects that a modification to a size of one of caches will be on performance of operations at the multi-level cache based on results of the calculating the performance parameters. Upon estimating an increase in performance of one of the caches, the process repartitions memory to increase allocation to cache that is determined to have increased performance responsive to the estimating, and repartitions memory to decrease allocation from the other cache.

Before further description of the embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable and may also be referred to herein as a computer-readable program medium.

In certain embodiments, the term "IO request" or simply "IO" or "IO" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, XtremIO (available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random IO data. In an exemplary Content Addressable Storage (CAS) array (e.g., as described in U.S. Pat. No. 9,208,162 (hereinafter "162 patent")), which is hereby incorporated by reference), data is stored in blocks, for example of 4 KB, where each block has a unique large hash signature, for example of 20 bytes, saved on Flash memory. In certain embodiments, a long hash is a value computed based on a data packet, such as a SHA-1 hash that is 20 bytes in length, but this is not limiting. As described herein, hash signatures (also referred to herein as full hashes or long hashes) are accessed by small in-memory handles (called herein, interchangeably, hash handles, short hash handles or short hashes)), for example of 6 bytes. These handles are unique to each array, but not necessarily unique across arrays. A hash signature is unique, meaning that if two hash signatures are the same then their corresponding data blocks are the same. In certain embodiments, a hash signature may be represented by a short hash generated by using, for example, processes shown in FIG. 12A of the '162 patent. Short hashes are not necessarily world-wide unique, but in certain embodiments short hashes can be unique within a domain. In certain embodiments, the long hash can be computed or determined based on the short hash, using, for example, processes shown in FIG. 12C of the '162 patent.

When replicating between two CAS arrays, it is much more efficient to use hash signatures instead of sending the full block. If the target already has the data block corresponding to the hash signature, there is no need to send the corresponding data. However, reading the hash signatures may be expensive, and is wasteful if the target does not have the data (in this case it can be faster to send the data without a hash signature, and let the target calculate the hash signature.) While the hash handles are readily available without the need to read from Flash, since the hash handles are not unique, they cannot be easily used to check if a target contains a hash signature. In some implementations, hash handles are shortcuts for hash signatures, and can give a reliable hint of the existence of a hash signature in an array.

It is envisioned that at least some embodiments herein are usable with embodiments described in commonly owned U.S. Pat. No. 9,104,326 ("Scalable Block Data Storage Using Content Addressing," hereinafter "326 patent"), which is hereby incorporated by reference.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

FIG. 1A shows an illustrative content-based data storage system 100 with deduplication that may have multi-level data caches in accordance with embodiments of the disclosure. In the illustrated embodiment, first, second, third, and fourth nodes 102, 104, 106, 108 can be interconnected by a switch 110 via a switch interface 111. The first node 102 can include a control system 114 and a data system 116. In embodiments, separate data and control planes may be provided by the control and data systems 114, 116. The control system 114 may control execution of read and write commands to the storage devices 112. The data systems 116 may be connected to the storage devices 112 and, under control of a respective control system 114, may pass data to and/or from the storage devices via suitable storage drivers 113.

The data and/or control systems 114, 116 may retain extracts of the data stored in the storage devices 112. In embodiments, the data extracts may be generated by cryptographic hashing of the data content in the data blocks. In embodiments, the extracts may be used for content addressing of the data blocks to the physical storage devices 112.

The second node 104 can include a hash system 119 to generate the hash/extract, which can be referred to as a content fingerprint for the data blocks. The second node 104 can also include a routing system 118, along with a switch interface 111 and a SAN interface 115. The routing system 118 may terminate storage and retrieval operations and distribute commands to control systems 114 that may be selected for the operation in such a way as to retain balanced usage within the system. In the illustrated embodiment, the third node 106 can be similar to the first node 102 and the fourth node 108 can be similar to the second node 104.

The routing systems 118 may use the hash values calculated from data blocks to select control systems 114 for distribution. More particularly, selection of the control system 114 may use hash values or may rely on the user address and not on the content (hash). The hash value may, however, be used for selecting the data system 116, and for setting the physical location for data storage within the data system.

In example embodiments, control modules 114 (also referred to as "C Modules") can include a C cache 115 and the data modules 116 (also referred to as "D Modules") can include a D cache 117. As explained more fully below, the C cache 115 can include addresses and address hashes, and the D cache 117 can include, for each bucket, physical data location information, a filter, a hash to physical location, and bucket information. The control modules may be referred to as a logical layer, holds the metadata for the logical layer, and implements the volume/snapshot operations. The data module manages the SSDs and implements one or more RAID algorithms as described further herein.

In some examples, the system 100 may employ more than a single type of memory technology, including a mix of more than one Flash technology (e.g., single level cell (SLC) flash and multilevel cell (MLC) flash), and a mix of Flash and DRAM technologies. In certain embodiments, data mapping may optimize performance and life span by taking advantage of the different access speeds and different write/erase cycle limitations of the various memory technologies.

FIG. 1B is an example of a system that can include a hash (H) system 150 communicatively coupled to a routing (R) system 152, which can be communicatively coupled to a control (C) system 154 and a data (D) system 156. The data system 156 can be communicatively coupled to any practical number of memory devices 158. The routing system 152 can route read/write commands from a host (not shown) to control and data systems 154, 156 for execution. In embodiments, the data content-based mapping to physical storage 158 can distribute workload relatively evenly and provide separation of the control and data paths. Read and write operations to the SSDs 158 can be used to generate priority values for the data blocks, as described more fully below.

A function of the H module 150 is to calculate the Hash function value for a given block of data, e.g., data which is the subject of storage commands. The hash values calculated may later be used for retrieval. The Hash function may be based on standards-based hash functions such as SHA-1 and MD5, or based on a proprietary function, but this is not limiting. The hash function is selected, in certain embodiments, to generate a uniformly distributed output over the range of potential input values. In certain embodiments, H modules 150 share nodes with an R module 152, but that is not limiting. More generally, the H modules 150 can reside in certain nodes, in all nodes, together with R modules 152, or together with C modules 154 or D modules 156.

A function of the R module 152 is to terminate storage area network (SAN) Read/Write commands and route them to appropriate C and D modules 154 and 156, for execution by these modules. By doing so, the R module 152 can distribute workload over multiple C and D modules 154, 156, and at the same time create complete separation of the Control and Data planes, that is to say provide separate control and data paths. In certain embodiments, the R module 152 routes SCSI IO request to the C modules 154, guarantees execution, and returns the result. In certain embodiments, the R module 152 maintains an up to date data structure called an address-to-control module (A→C or A2C) table, coordinated with the management back end (MBD), indicating which C module 154 is responsible for each logical X-page address (LXA), and also showing a balance a range of all possible LXAs between available C modules 154. In certain embodiments, for write operations, the R module 152 instructs the calculation of a hash digest for each X-page by requesting such calculation from a hash calculation module (e.g., the H module 150).

A function of the C module 154 is to control the execution of a Read/Write (R/W) command, as well as other storage functions implemented by the system. The C module 154 also may maintain and manage key metadata elements. In certain embodiments, the C module 154 receives an IO request from an R module 152 on a certain sub-LUN (SL), guaranteeing its atomic execution (i.e., execution independent of other processes) and returns the result to the R module 152. The C module 154 also communicates with D modules 156 to execute the IO requests. In addition, the C module 154 monitors the disk content of its logical space by associating each LXA with its hash digest; and balances the work load between the D modules for the SLs that the C module 154 is maintaining. The C module 154 and data module 156 each maintains certain data structures and corresponding metadata journals for those data structures. For example, the C module 154 maintains an "address to hash" table (A2H table, also referred to herein as A→H table) and corresponding A2H metadata journal, in the C module 154. The D module 156 maintains the "hash to physical location of data" table (H2P table, also referred to herein as H→P table) and its corresponding metadata journal in the D module 156. That is, in certain embodiments, the in-memory copy of a journal is in the same module as the corresponding metadata table. In certain embodiments, the on-disk journal copy is persisted and mirrored across nodes in the cluster in journal disk chunks.

The A2H table maps each LXA that belongs to the SLs that the C module 154 is responsible for, to the hash digest representing the X-page Data that currently resides in that address. The C module 154 maintains an A2H table in a persistent way. The C module 154 may initiate requests to D modules 156 in order to save table pages to disk and read them from disk. In addition, to avoid frequent disk operations, the C module 154 maintains a journal certain of the latest table operations. These journals include (but are not limited to) the A2H metadata journals (A2H Hash tree) and dirty tree update metadata journals. The dirty tree and corresponding functionality are described further in commonly assigned U.S. patent application Ser. No. 15/656,168 entitled "Online Metadata Backup Consistency Check," filed on Jul. 21, 2017, which is hereby incorporated by reference.

The data module (D) takes charge of Hash Metadata (HIVID), physical layout (PL) metadata, hash to physical layout (H2P) mapping, H2P metadata journals, on disk block allocation (3WBM) and disk block allocation bitmap (3WBM) journals. For example, in certain embodiments, the metadata journals include information associated with time-based changes to information in the respective A2H and H2P tables and time-based changes to the disk block allocation bitmap.

The H2P table maps each range of hash digests to the corresponding D module 156 responsible for that range. The H2P table balances the range of all possible hash digests between the available D modules 156.

A function of the D module 156 is to perform the actual read/write (R/W) operation by accessing the storage devices 158 attached to it. The D module 156 may maintain metadata related with the physical location of data blocks. In certain embodiments, the D module 156 is responsible for: maintaining a set of LUNs which are attached locally and performing all IO operations on these LUN; managing the physical layout of the attached LUNs; managing the mapping between X-Page Data hash digests and their physical location in a persistent way; managing deduplication of X-Page Data in a persistent way; and receiving disk IO requests from C modules 154, perform them and returning a result.

In certain embodiments, the D module 156 is also responsible for, for each write operation, backing up the X-Page Data in the designated D backup module and performing read-modify operations for writes that are smaller than X-Page size (This process also involves, in certain embodiments, computing a hash digest for these X-Pages). In certain embodiments, the D module 156 maintains an up-to-date H→(D, $D_{backup}$) table coordinated with the MBE, where the H→(D, $D_{backup}$) table is expected to balance the range of all possible hash digests between the available D modules 156.

Balancing between the D modules is based on hashing of the content. For example, in certain embodiments, the D module 156 makes use of a hash digest metadata table. The hash digest metadata table maps each in use hash digest, that represents actual X-Page Data, to its metadata information including its physical page on the storage media (SSD), its memory copy (if exists), a mapping to any backup memory copy and a reference count for the purpose of deduplication. The D modules 156 manage a separate nonvolatile memory pool (NVRAM or UPS protected) for X-Page Data backup purposes. The backup holds X-Pages that are held in memory of the D primary and have not yet been de-staged. This is an example of the user data de-stage cache (UDC). There are dirty X-pages waiting to be persisted on disk. When re-balancing between D modules 156 occurs (due to a D module 156 failure for example), the D module 156 may communicate with other D modules 156 in order to create new backup copies or move a primary ownership as required.

The D modules 156 allow deduplication per X-Page Data by maintaining a persistent reference count that guarantees only one copy per X-Page Data. The D modules 156 manage the hash digest metadata table in a persistent way. The table is coordinated with the physical layout for physical pages allocation, with the memory pointer, memory backup pointer, and deduplication reference count.

As will be appreciated, the R, C, D, and H modules 150-156 may be implemented in software, and executed on a physical node. In addition, the aforementioned '326 patent provides information relating to additional functionality of the R, C, D, and H modules 150-156, in certain embodiments.

Figure 2:
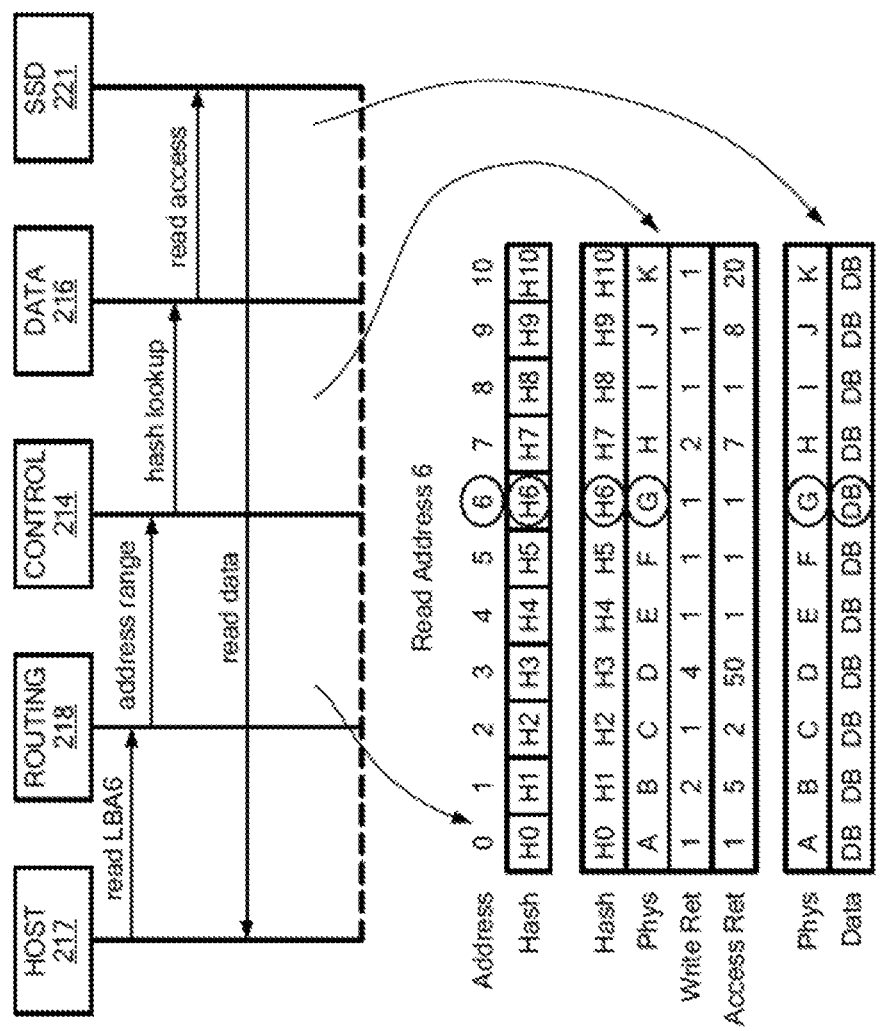
FIG. 2 is a flow diagram of read and write operations for the system of FIG. 1A.

FIG. 2 shows an example IO operation. A host 217 may issue a read command for a logical block address, which is shown as address "6," via a Fibre Channel or iSCSI port, for example. The routing system 218 may receive the read command and determine a requested address range in data blocks of 4K, for example, and pass the address information to the control system 214. The control system 214 may look up address 6 to obtain the hash value, which is shown as H6. This may be referred to as address-to-hash (A2H) lookup. The H6 hash value may be passed to the data system 216 which can perform a look up of the H6 hash value in a hash-to-physical address (H2P) table to read the physical address for the data. In the example, the physical address is shown as "G." The data system 216 can use the physical address to read the data block (DB) at physical address G in the SSD 221. A reference count can correspond to a number of times the hash value is referenced in physical storage. In embodiments, write reference information can be modified for each unique and/or deduplicated write and access reference information can be modified for each read and/or write access.

For a write operation from a host, the routing system 218 can receive the write data and can segment the data stream into data blocks and generate hash values for the data blocks. The hash value can be provided to the control system 214 to determine if the write data is unique. If unique, the hash value can be placed in an address mapping. The control system 214 can pass the hash value to the data system 216, which can assign the hash value to a physical address and write the data block(s) to the SSD at the physical address. In embodiments, the write reference information and/or the access reference information, can be modified, e.g., incremented.

If the hash value generated by the routing system 218 is not unique, the control system 214 can determine that data already exists at the physical address for the hash value. Since the data already exists, the data system 216 can increment the write reference information for the data block. In embodiments, the access reference information can also be modified. The data may not be written to the SSD. Deduplication may refer to a write operation where a hash for a data block is found not be unique and the non-unique data block is not written to physical storage. The reference count for the non-unique hash may be incremented.

Figure 3:
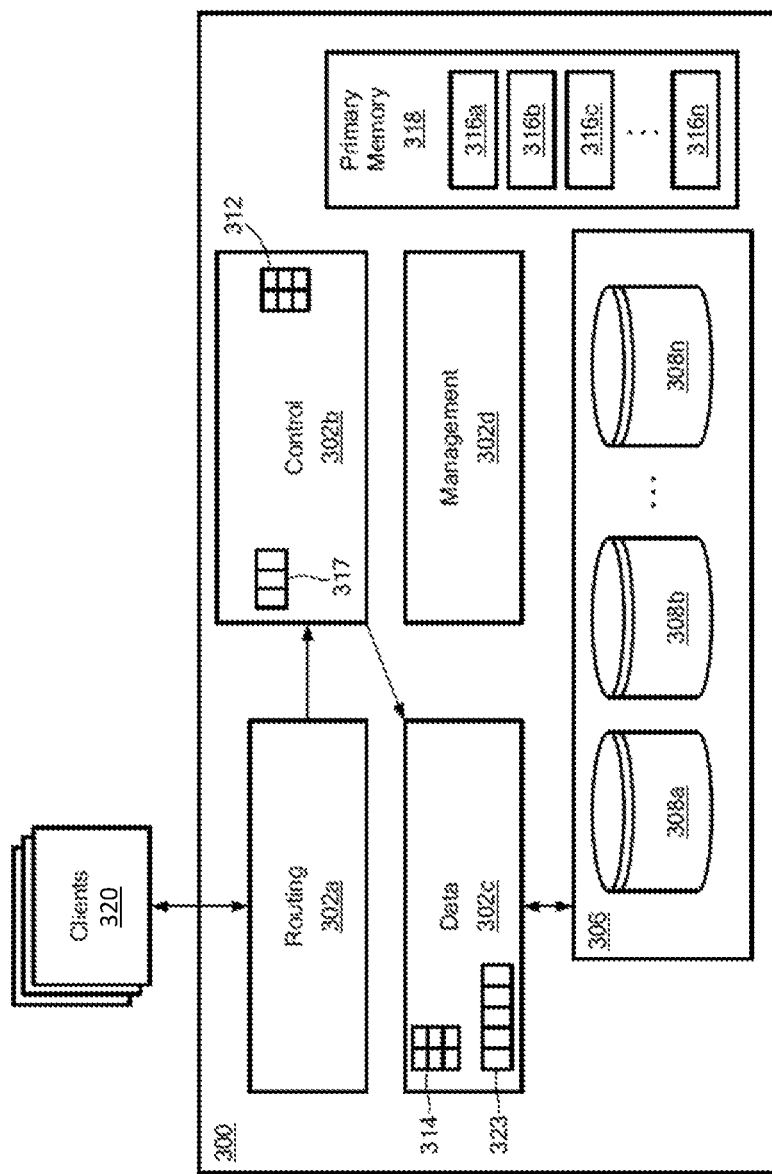
FIG. 3 is a block diagram of a content-based storage system having a control module with a first cache and a data module with a second cache in accordance with an embodiment.

FIG. 3 shows a storage system 300 according to an illustrative embodiment. The storage system 300 may be the same as or similar to a node within the distributed storage system of FIG. 1A. The storage system 300 may include a plurality of modules 302a-302d (generally denoted 302 herein), a storage array 306 comprising a plurality of storage devices 308a . . . 308n (generally denoted 308 herein), and a primary memory 318. In some embodiments, the storage devices 308 may be provided as solid-state devices (SSDs).

As described further herein, the storage system 300 also can include a C (also called logical) cache 317 and a D (also called physical) cache 323. The C cache 317 and/or the D cache 323 can, in certain embodiments, be physical devices configured to store certain data so that future requests for that data can be served faster. Although the C cache 317 and D cache 323 are shown as being part of the storage system, it is understood that the C cache 317 and/or D cache 323 can be located anywhere such that they are accessible quickly to the storage system. Data that is stored within a cache might include data values that have been computed earlier or duplicates of original values that are stored elsewhere. If the requested data is contained in the cache (herein referred to as a cache hit), this request can be served by simply reading the cache, which is comparatively faster than going to other types of memory. On the other hand, if the requested data is not contained in the cache (herein referred to as a cache miss), the data may have to be to be recomputed or fetched from its original storage location, which is comparatively slower. Hence, the greater the number of requests that can be served from the cache, the faster the overall system performance becomes.

The primary memory 318 can be any type of memory having access times that are faster compared to the storage devices 308. In some embodiments, primary memory 318 may be provided as dynamic random-access memory (DRAM). In certain embodiments, primary memory 318 may be provided as synchronous DRAM (SDRAM). In one embodiment, primary memory 318 may be provided as double data rate SDRAM (DDR SDRAM), such as DDR3 SDRAM.

As described above, the control subsystem 302b may be configured to maintain a mapping between IO addresses associated with data and the corresponding chunk hashes. As shown in FIG. 3, this mapping may be maintained using a data structure 312, referred to herein as an "IO address to chunk hash mapping table" or "A2H table," (also known as A→H table) according to some embodiments. In one embodiment, IO addresses may be logical addresses used by clients 320 to access data within the storage system 300.

As also described above, the data subsystem 302c may be configured to maintain a mapping between chunk hashes and physical storage addresses (i.e., storage locations within the storage array 306 and/or within individual storage devices 308). This mapping may be maintained using a data structure 314, referred to herein as a "hash to physical address mapping table" or "H2P table," or "H→P table," according to some embodiments, where this table, in certain embodiments, includes information similar to that of the aforementioned HMD (hash metadata) and PL (physical layout) tables. In certain embodiments, as described, for example, in the incorporated by reference patents, there also may be a mapping referred to as the H2D or H→D table, where D stands for disk physical layout. In certain embodiments, the H2P table is maintained to route data with different hashes to different D modules. The data subsystem 302c may be also be configured to read and write data from/to the storage array 306 (and/or to individual storage devices 308 therein).

As described above, in a content addressable storage system, data is stored in blocks, for example 16 KB, 8 KB, 4 KB, etc., where each block has a universally unique large hash signature, for example of 20 bytes, which can be saved to disk, e.g., Flash memory. As described herein, hash signatures may be accessed by small in-memory handles (referred to herein as short hash handles, hash handles, or short hashes), for example of 6 bytes. These short hashes may be unique to each volume/array, but not necessarily unique across volumes/arrays. Additional information relating to hash-based replication, computation of hashes, generation and use of short hash handles can be found in U.S. Pat. No. 9,378,106 ("Hash Based Replication"), U.S. Pat. No. 9,208,162 ("Generating a Short Hash Handle") and U.S. Pat. No. 9,396,243 ("Hash-Based Replication Using Short Hash Handle and Identity Bit"), each of which is hereby incorporated by reference.

In embodiments, address to hash mapping (A2H) maps an address inside a volume to the short hash value of its data. In embodiments, metadata can include for each address the hash value of the content. If the basis for deduplication is 16 KB, then the metadata holds for each address the short hash value of the data to which the address points. In cases where access to the volume is in larger chunks than the size of the basic hash value, the metadata for the address space can be readily cached.

As also noted above, hash to physical disk locations can include for each hash key (e.g., 6 bytes) the location on the disk, and the reference count. Where a storage system uses hash keys of 6 bytes, there may be collisions of data generating the same hash. If there is a collision, a new hash key from a different hash address space is generated for the data when the data is written. This means that the hash to physical disk location table may search for a hash value every time a new write arrives. If the write has the same hash value, there is a need to check the long hash value, and verify if there is a hash collision, or whether it is actually the same data. This means that during every write if the hash to physical disk location table is not in the system memory, there may a need to fetch the metadata of the hash from the disk to verify if such a hash exists. It will be appreciated that metadata structures may consume most of system memory, e.g., DRAM, in the storage system, so that the metadata limits the total size of the storage system.

Figure 4:
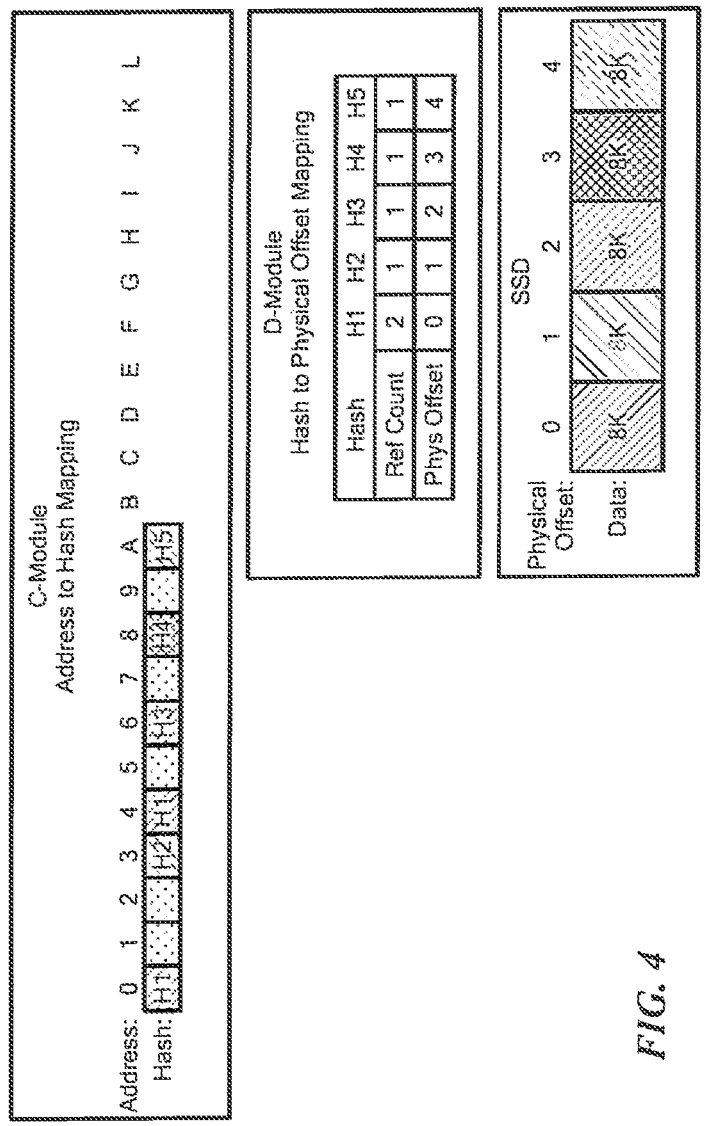
FIG. 4 is a schematic representation of address-to-hash (A2H) mapping in a control module and hash-to-physical (H2P) mapping in a data module for a content-based storage system in accordance with an embodiment.

FIG. 4 shows an example control or C module address to hash (A2H) mapping 400. As can be seen, as data blocks arrive, the content for the address is hashed to generate H1, H2, H3, H4, H5, as shown. It should be noted that H1 appears twice and is deduplicated. The D-module includes a hash to physical (H2P) mapping showing the physical offset of the data along with a reference count indicative of how many times a given hash value occurs. It will be appreciated that a particular hash value having a high reference count will likely be accessed more often than hash values having a low reference count. In embodiments, a reference count is incremented each time the hash value is generated in a volume. Thus, higher reference count hash values may be preferred for placement in D cache over low reference count hash values. It can be seen that the physical offset corresponds to the order in which a unique hash value is generated. For example, H3 is shown with an offset value of 2 since a second H1 value was deduplicated.

In embodiments, for a particular volume, an address to hash mapping maps an address inside the volume to the short hash value of its data. In embodiments, metadata includes for each address the hash value of the content. If the basis for deduplication is 16 KB, then the metadata holds, for each address, the short hash value of the data to which the address points. In cases where access to the volume is in larger chunks than the size of the basic hash value, the metadata for the address space can be cached. Any suitable caching algorithm can be used, such as LRU (least recently used). For example, read accesses may be sequential with so-called hot spots for certain access areas. A system can implement a C cache for the metadata of the A2H table by using LRU caching with prefetching of nearby metadata. In embodiments, the full A2H table will be stored on the disk.

As described above, a deduplication system, such as XtremIO has two layers for accessing the volume data. One layer maps from an address in the volume to the hash value of the data, and a second layer maps from the has value to a location on disk.

The address to hash mapping maps an address inside a volume to the hash value of its data. The metadata includes, for each address, the hash value of the content. If the basic unit of deduplication, for example, is 16 KB, then the metadata holds for each address the short hash value (6 bytes) of the data the address points to. In many cases, access to the volume is in larger chunks than the size of the basic hash value. This means that the metadata for the address space can be easily cached, and standard prefetching algorithms may work fine.

The hash to physical disk location includes, for each hash value (6 bytes), the location on the disk and the reference count. Since the system is designed to keep hash keys of 6 bytes, there may be a collision of data generating the same hash. If there is a collision, a new hash key from a different hash address space is generated for that data when the data is written. This means that the hash to physical disk location table must search for a hash value every time a new write arrives. If the write has the same hash value, there is a need to check the long hash value and verify if there is a hash collision or whether it is actually the same data. This means that during every write if the table is not in the system memory, there is a need to fetch the metadata of the hash from the disk and very whether such hash exists.

Metadata structures in the above-described storage systems consume most of the dynamic random access memory (DRAM). Thus, the metadata limits the total size of the storage system. The metadata size can further limit the scalability of the storage system since all of the metadata is kept in DRAM (e.g., the total address space of the system is limited). In addition, de-staging the metadata in a trivial way may cause a significant performance impact as each read operation will need to fetch metadata that can cause multiple IO commands. Further, de-staging the metadata in a trivial way can also cause durability issues since the metadata needs to be de-staged and accessed causing a decrease in the durability of the flash devices. Moreover, trivial metadata caching may lose effectiveness as caching at the address space may not benefit from deduplication and may require accesses to the location of the hash. For write operations, each cache collision may cause more accesses to disk which can impact performance. Additionally, static metadata cache size partitioning may not be effective as the system lacks the ability to budget sufficient memory for each cache layer.

In a dual layer cache system, the address to hash mapping maps an address inside a volume to the hash value of its data. The metadata includes for each address the hash value of the content. If the basic element used in deduplication is 16 KB, then the metadata hold for each address is the short hash value of 6 bytes that the data in the address points to. In many cases, access to the volume is in larger chunks than the size of the basic hash value. This means that the metadata for the address space can easily be cached, and standard prefetching algorithms may work fine.

In many of the cases, accesses are sequential and there are also hot spots for access areas. A system may implement a cache for the metadata of the A2H table by using a simple LRU cache with prefetching of near metadata. One solution may be to keep the physical disk offset of the hash value along with the address to hash data, though this may not be possible when keeping the whole metadata in memory, since the location on the disk consumes a large amount of memory. However, when keeping the metadata on the disk, the extra amount of metadata kept is not significant.

The offset references are held in the logical layer for demoted pages, and this logical to offset will be built inline (e.g., during the Write Boost[the "cache" which is used to submit IO before doing the read modify write] (wherein the de-stage operation refers to the backend write)), thus will not require any massive operations. For data loaded in the cache, the physical offset is held (since once it is loaded it is available). Thus, every time there is a cache hit for the metadata in the A2H map, there is no need to look for the location of the data matching the hash, as it will be immediately available.

Since keeping the offset to the disk in the cache along with the hash value which matches the address may be relatively space consuming, for each offset in the cache the hash alone may be kept, or both the hash value and the location on the disk may be kept. Since data movement can also happen at the backend layer, the offset may not be accurate. But if the offset is not accurate, this will be cached during the read operation and then the real address can be accessed. As long as such an event is rare there will not be a significant impact on the performance.

One disadvantage of caching A2H data is that the same hash value can be cached multiple times, consuming a significant amount of memory. Write commands are not interesting in the A2H metadata, as with the new write comes a new hash value.

The hash to physical disk location includes for each hash key (e.g., 6 bytes) the location on the disk, and the reference count. In an embodiment in which the system keeps hash keys of, for example, 6 bytes, there may be collision of data generating the same hash. If there is a collision, a new hash key from a different hash address space is generated for the data when the data is written. This means that the hash to physical disk location (H2P) table must search for a hash value every time a new write arrives. If the write operation has the same hash value, there is a need to check the long hash value and verify if there is a hash collision, or whether it is actually the same data. This means that during every write operation if the table is not in the system memory, there is a need to fetch the metadata of the hash from the disk and verify if such hash exists.

Caching the hash to physical location does not have the locality features of the A2H mapping (e.g., data which is close in space usually has completely different hash value), which means that prefetching data for the cache is typically not possible directly from the hash space. The value of caching entries in the hash space is that if a hash value is popular, within a single entry it is possible to hash for all the relevant volumes sharing the hash and create a much more compact hash table.

A mechanism is needed to fast check if a hash value exists without going to the disk to look for the metadata. The above-referenced bloom filters can be used in which a separate bloom filter is used for each set of hash values.

As indicated above, a bucket in the hash table data structure represents a corresponding hash space, and a super bucket indicates a logical aggregation of buckets. A bloom filter is created for each super bucket. The bloom filter indicates for each write if data with the same hash exists. If so, the system checks to see if the hash value exists in the hash to physical disk metadata cache.

If the hash value exists but not in the metadata cache for the H2P, the whole metadata for the super bucket is read and the system looks for identical hash value. If there is no collision (which may happen in most cases), the write operation proceeds without fetching metadata from the disk. Smaller bloom filters may be a little less effective than larger ones but will allow the system to handle deletes quickly (bloom filters do not handle deletes and need to be rebuilt). The small bloom filters are easily rebuilt. One of the challenges with bloom filters is that data cannot be deleted from them. Thus, the system maintains many bloom filters, e.g., one filter for each super bucket. The system can use false positive data (e.g., an indication from the bloom filter that a hash value exists) to decide to rebuild the bloom filter. This can be performed efficiently while searching demoted data.

The system creates a space cache that will hold a number (X) of entries for each super bucket. Entries with higher reference counts in the hash cache may be given preference, as entries which are popular but have only one reference will probably be cached at the A2H level. This can prevent double caching (e.g., entries with a reference count of 1 will be removed from cache with higher probability).

In embodiments, entries will always go through the hash space cache, and the bloom filter will not include hashes that are in the cache. In this way, if a hash is short leaving (a time relative term by definition), it will be in the cache, and will not "dirty\corrupt" the bloom filter. To prefer eviction of entries with low reference counts, the caching algorithm holds a separate LRU for entries with a reference count greater than 1. Once a new entry arrives, the system will select which LRU needs to be evicted, and the probability of evicting from the LRU with a reference count=1 will be higher.

Thus, the embodiments provide two layers of caching, one in the A2H (with prefetching based on offset) and one in the H2P. In embodiments, the physical address is kept with the local address in cache to avoid going to the H2P layer of cache. A local bloom filter is used to optimize the write operations, and a H2P cache eviction process is provided with priority for keeping entries with highest reference counts.

Figure 5A:
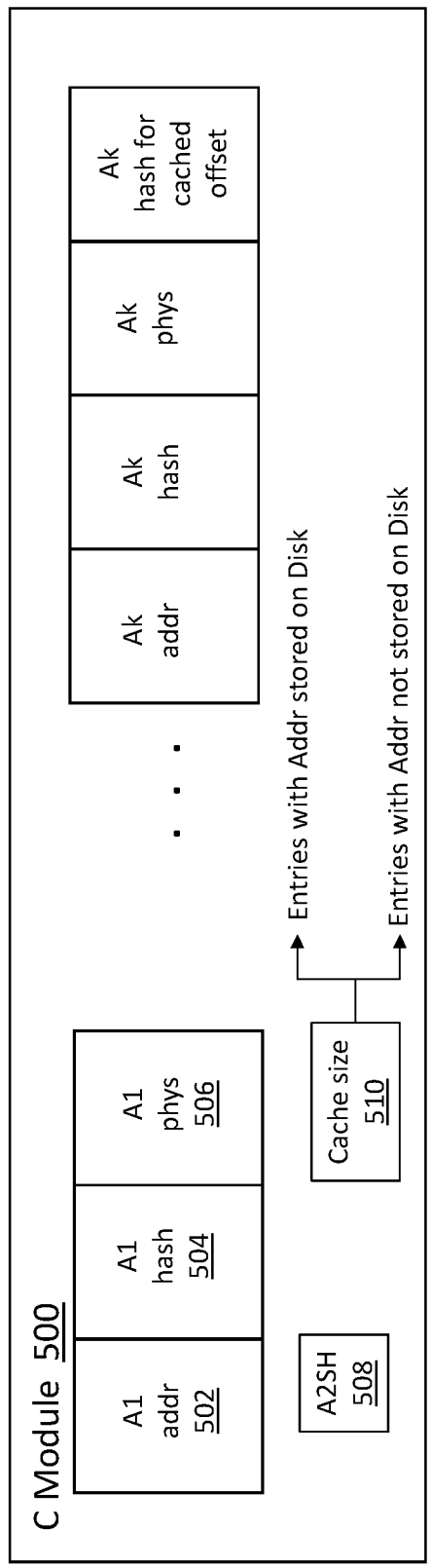
FIG. 5A is a schematic representation of a control module cache and FIG. 5B is a schematic representation of a data module cache for memory management of multi-level metadata cache for content-based storage a content-based storage system flow in accordance with an embodiment.

FIG. 5A shows an example C cache configuration for control modules, such as the control module 114 of FIG. 1A. In embodiments, a C cache 500 includes two types of entries. A first type of entry includes an address 502, a hash value for the address 504, and physical location 506 matching the hash value 504. In embodiments, the hash value 504 corresponds to a short hash value and the long hash value is stored in disk memory. The second type of entry is an address-to-short hash (A2SH) value 508. This hash is a specified size (e.g., 6 bytes) for the cached offset.

Figure 5B:
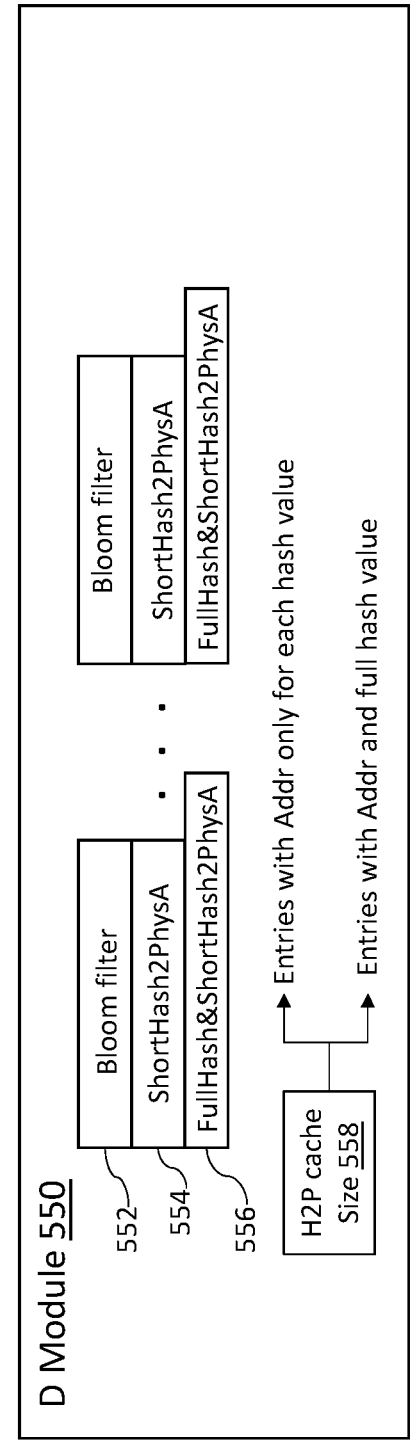

FIG. 5B shows an example D cache 550 having entries for a bloom filter 552, one bloom filter for each superbucket, a short hash-to-physical address value 554, and a full hash & short hash-to-physical address 556. For write operations, the D cache enables the system to efficiently determine whether a hash value exists without accessing metadata on disk unless needed. In example embodiments, the bloom filter 552 is used to determine whether a hash value is present for a given write operation. While false positive matches may occur, false negatives will not. That is, the result is a 'may be in the set' or 'definitely not in the set.' Elements can be added but not removed from the bloom filter. In the H2P cache, for some hash values, the location on disk is stored, and for other hash values the full hash along with the location may be stored. The idea is that if there is a piece of data that is written often (e.g., a zero block or a block with content value, or any other block of data that is written often) keeping the whole hash value will be beneficial since it will avoid disk accesses. This is possible in caching because if all of the values are kept, the memory consumed would be high.

In embodiments, a process evaluates and determines how much memory to invest in the bloom filters, for example, investing a byte for each 16 KB block means 64 GB is needed for bloom filters to cover an address space of 1 TB raw uncompressed data, and the probability of getting a false positive (e.g., a hash which the system does not have but thinks that it may have will be around ⅛; thus, doubling the space will reduce the probability to ¹/₁₆, and half of space will increase the probability to ¼). The process evaluates various criteria and determines how much memory to give the bloom filters compared to the other parts of the cache.

In embodiments, the cache consists of five parts: a cache size 510 (FIG. 5A) for the A2H table (for entries in which the address is kept on disk and for entries that are not kept on disk), a bloom filter area and a cache size 558 (FIG. 5B) for the H2P table (for entries with address only for each hash value and for entries with the address and the full hash).

In embodiments, a process decides on how to budget the five caches from the total memory budget between the caches in a dynamic way using performance parameters. For example, the system can calculate the hit rate (e.g., one performance parameter) for each type of the entries (e.g., in the A2H the entry—address, hash, physical location or address-to-short-hash—is found 90% of the time). The system also calculates what effect decreasing the cache size would be (e.g., which entries are at the end 1% of the LRUs, how many hits are determined for this LRU, and what the effect of reducing the cache size of the A2H by 1% would be). Based on the hit rate it can be understood what the expected performance will be. For each hit the system may get the same performance as if all metadata were in memory, and for a miss there is a payment. If the disk address is not available, the computation is a bit more complex as the system will need to evaluate what the probability is that it will have a hit or a miss in the H2P table but this is also possible.

The same may be applied for the H2P cache. The system can determine how effective the cache is (e.g., how many times is there a cache hit from the end of the LRU—as another performance parameter). The system may then increase the LRU, which is more effective. The system adds some amount 'x' of memory (for example, add to the A2H cache and remove memory from the H2P cache).

This process may be applied to the bloom filter as well (e.g., dynamic memory allocation for the bloom filter by having the bloom filter for some superblock with more bits than bloom filters for other superblocks). Based on the amount of memory for the bloom filters, the system can determine/predict the false positive rate and understand whether the performance will improve by adding memory to the bloom filter or by moving the memory to one of the cache layers.

Regarding addresses with full hash, the system can look at the amount of hits received for a write hash. If that write hash is written many times it can be kept in the cache and the system evaluates the effectiveness of adding the memory in the cache to keep the full hash value.

Overall, the system may periodically check the effectiveness of each cache layer and try to modify the partition of the memory to see if performance will improve due to increased effectiveness of the caches.

Figure 6:
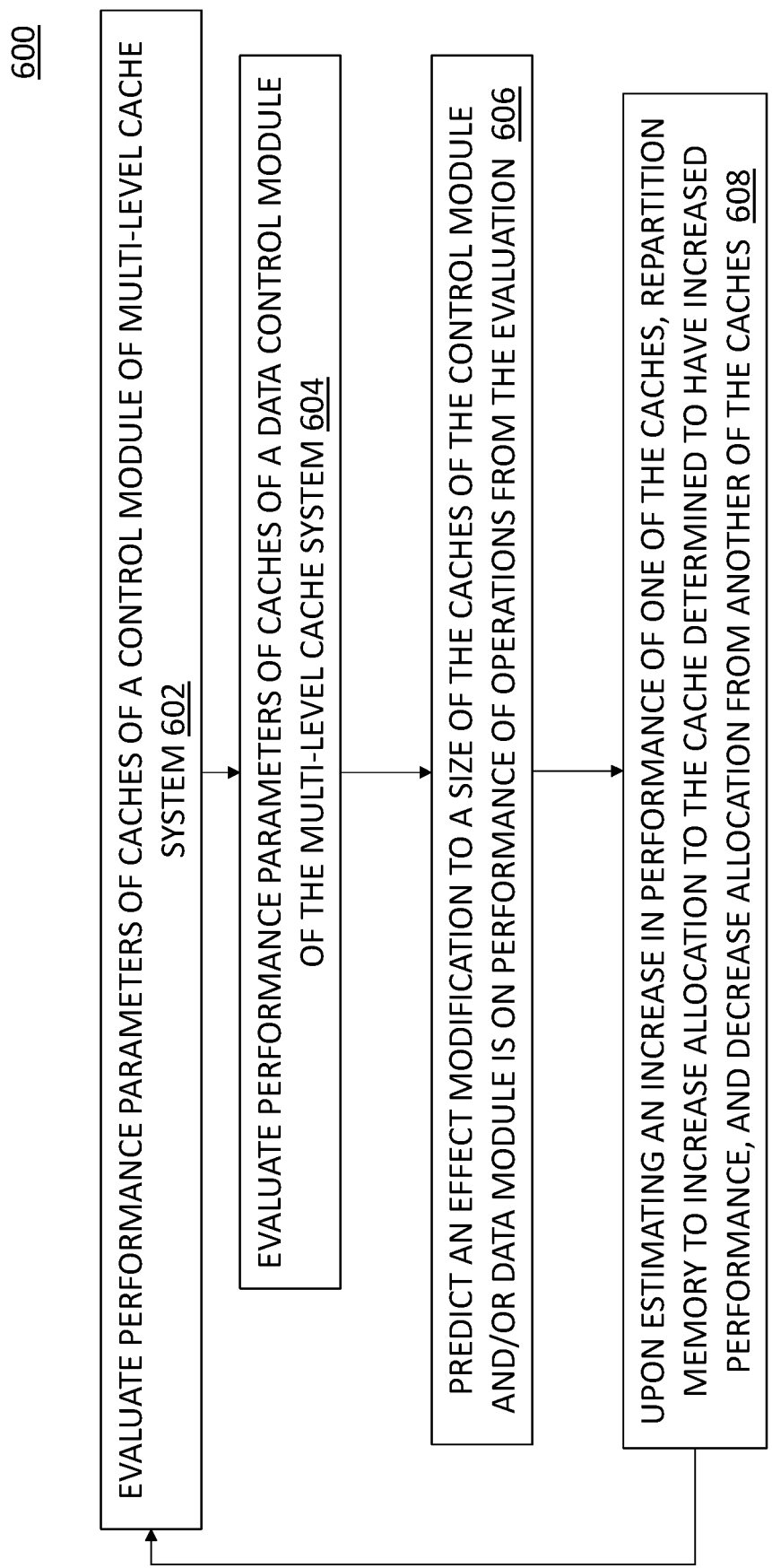
FIG. 6 is a flow diagram for implementing memory management of multi-level metadata cache for content-based storage in accordance with an embodiment.

Turning now to FIG. 6, a process 600 for implementing the memory management of deduplicated storage in a multi-layer cache system will now be described.

In block 602, the process 600 evaluates performance parameters of a control module cache of the multi-layer cache system. The control module cache includes address-to-hash (A2H) values that further include an address value, a hash value, a physical location value, and a hash for cached offset value. The hash for cached value indicates that the correct data has been read from the disk. There is another type of shorter entry that includes only address-to-short hash (when all data is in memory). The control module cache uses prefetching based on offset values.

In block 604, the process 600 evaluates performance parameters of a data module cache of the multi-layer cache system. The data module cache includes hash to physical values corresponding to the A2H values, a filter mechanism, and a bucket value for a bucket. The filter mechanism is configured to determine whether a hash value for a write operation exists.

The performance parameters evaluated for the caches may include, for example, a rate of hits estimated for an entry in the caches. Evaluating the performance parameters may include identifying an entry in the caches as least recently used (LRU).

In block 606, the process 600 predicts an effect that a modification to a size of one of the control module cache and the data module cache will have on performance of operations at the multi-level cache based on results of the calculating the performance parameters of the control module cache and the data module cache.

Upon estimating an increase in performance of one of the control module cache and the data module cache, in block 608, the process 600 repartitions the memory to increase allocation to the cache that is determined will have increased performance responsive to the estimating, and repartition memory to decrease allocation from the other cache. In embodiments, the repartitioning memory may include increasing allocation to the control module cache, removing allocation from the data module cache, and increasing the LRU of the data module cache based on a rate of hits for the LRU.

In an embodiment, the process 600 further evaluates false positive rates for the bloom filter. The bloom filter enables write operations without accessing metadata on disk. The process 600 may add memory to the bloom filter from one of the control module cache or moving memory from the bloom filter to one of the control module cache and the data module cache based on the performance results corresponding to the evaluating. The moving may include having the bloom filter for a superblock with more bits than a bloom filter for another superblock.

The bloom filter corresponds to the bucket associated with a corresponding bucket value. The bucket corresponds to a hash space. In embodiments, the process may also include rebuilding the bloom filter when it reaches a threshold of dirty entries.

In an embodiment, the process may provide an eviction mechanism through the data module cache for retaining entries having higher reference counts. The reference count corresponds to a number of volumes having a given hash value, the method further comprising caching hash values having reference counts at or below a given value at an address to hash level to avoid double caching.

In an embodiment, the process further includes, for an incoming write operation, determining whether a hash value for the incoming write operation exists in the bloom filter mechanism. If the hash value for the incoming write operation does not exist in the filter mechanism, the data for the incoming write operation is written to disk. On the other hands, if the hash value for the incoming write operation does exist in the filter mechanism, the process retrieves a full hash value for the data that exists in the filter mechanism.

Figure 7:
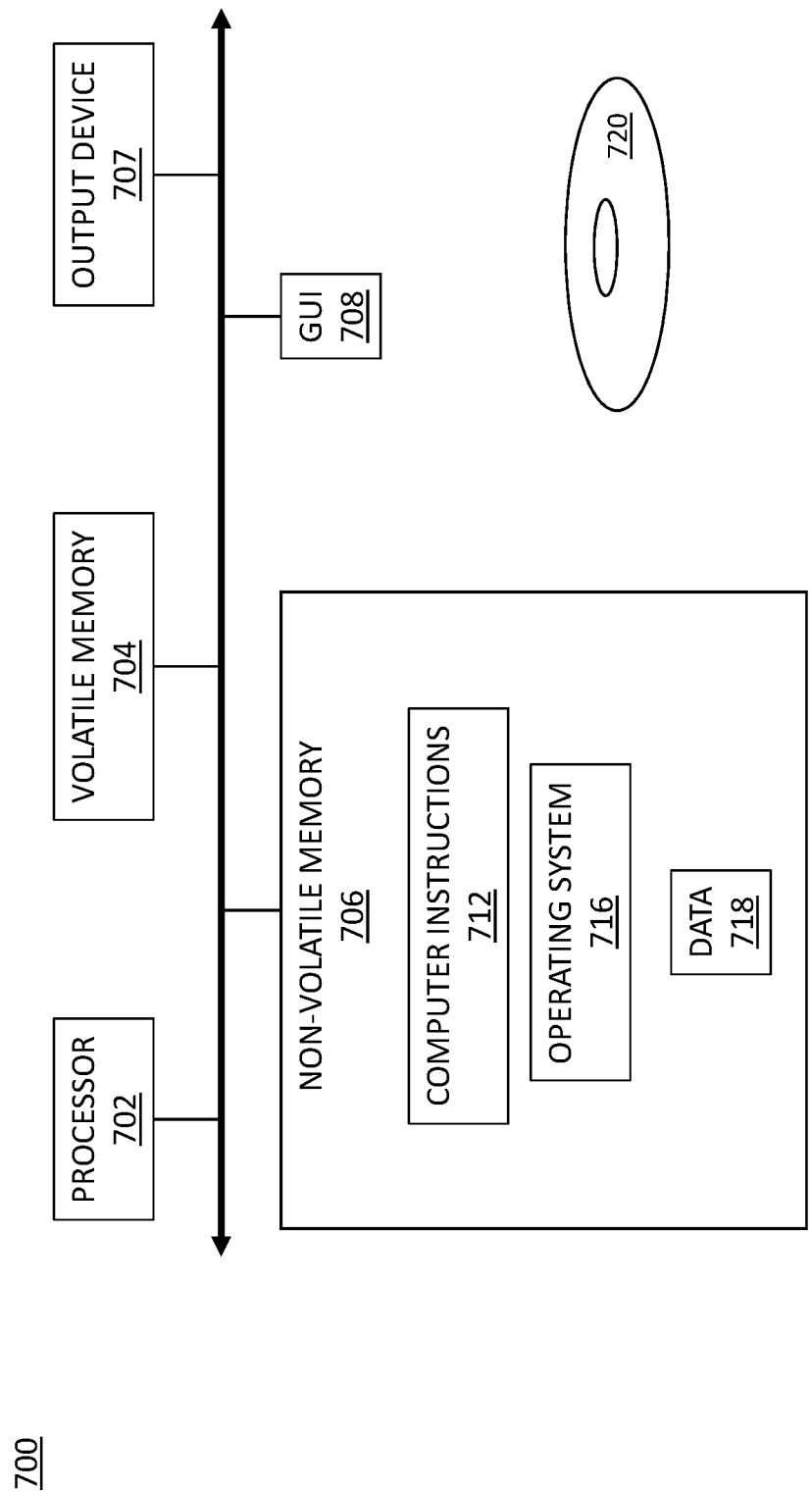
FIG. 7 is a block diagram of an illustrative computer that can perform at least a portion of the processing described herein.

FIG. 7 shows an exemplary computer 700 (e.g., physical or virtual) that can perform at least part of the processing described herein. The computer 700 includes a processor 702, a volatile memory 704, a non-volatile memory 706 (e.g., hard disk or flash), an output device 707 and a graphical user interface (GUI) 708 (e.g., a mouse, a keyboard, a display, for example). The non-volatile memory 706 stores computer instructions 712, an operating system 716 and data 718. In one example, the computer instructions 712 are executed by the processor 702 out of volatile memory 704. In one embodiment, an article 720 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

We claim:

1. A method for memory management of deduplicated storage having a multi-layer cache system, comprising:

evaluating performance parameters of caches of a control module of the multi-layer cache system, the caches of the control module having two types of entries, wherein a first type of entry includes address, hash, and physical location values, and a second type of entry includes address-to-short-hash (A2SH) values;

evaluating performance parameters of caches of a data module of the multi-layer cache system, the data module receiving write requests from the control module and the caches of the data module cache having three types of entries, wherein a first type of entry includes a short-hash-to-physical address, a full-hash-and-short-hash-to-physical address, and a filter mechanism, wherein the filter mechanism is configured to determine whether a hash value for a write operation exists;

predicting an effect that a modification to a size of one of the caches of the control module and the data module is on performance of operations at the multi-level cache based on results of the calculating the performance parameters of the caches of the control module and the caches of the data module; and upon estimating an increase in performance of one of the caches of the control module and the caches of the data module, repartitioning memory to increase allocation to the one of the caches that is determined to have increased performance responsive to the estimating, and repartitioning memory to decrease allocation from another of the caches.

2. The method of claim 1, wherein the performance parameters include a rate of hits estimated for an entry of the one of the caches.

3. The method of claim 2, wherein the evaluating performance parameters further includes identifying an entry in the one of the caches as least recently used (LRU), wherein repartitioning memory includes increasing the LRU of the one of the caches based on a rate of hits for the LRU.

4. The method according to claim 1, wherein the caches of the control module use prefetching based on offset values.

5. The method according to claim 1, wherein the filter mechanism comprises a bloom filter, the bloom filter enabling the write operations without accessing metadata on disk, the method further comprising:

evaluating false positive rates for the bloom filter; and adding memory to the bloom filter from one of the caches or moving memory from the bloom filter to one of the caches based on performance results corresponding to the evaluating, the moving including having the bloom filter for a superblock with more bits than a bloom filter for another superblock.

6. The method according to claim 5, wherein the bloom filter corresponds to the bucket associated with the bucket value, the bucket corresponding to a hash space, wherein the method further comprises rebuilding the bloom filter when reaching a threshold of dirty entries.

7. A system for memory management of deduplicated storage having a multi-layer cache system, the system comprising:

a memory comprising computer-executable instructions; and a processor operable by a storage system, the processor executing the computer-executable instructions, the computer-executable instructions when executed by the processor cause the processor to perform operations comprising:

evaluating performance parameters of caches of a control module of the multi-layer cache system, the caches of the control module having two types of entries, wherein a first type of entry includes address, hash, and physical location values, and a second type of entry includes address-to-short hash (A2SH) values;

evaluating performance parameters of caches of a data module of the multi-layer cache system, the data module receiving write requests from the control module and the caches of the data module cache having three types of entries, wherein a first type of entry includes a short-hash-to-physical address, a full-hash-and-short-hash-to-physical address, and a filter mechanism, wherein the filter mechanism is configured to determine whether a hash value for a write operation exists;

predicting an effect that a modification to a size of one of the caches of the control module and the data module is on performance of operations at the multi-level cache based on results of the calculating the performance parameters of the caches of the control module and the data module and upon estimating an increase in performance of one of the caches of the control module and the caches of the data module, repartitioning memory to increase allocation to the one of the caches and repartitioning memory to decrease allocation from another of the caches.

8. The system of claim 7, wherein the performance parameters include a rate of hits estimated for an entry of the one of the caches.

9. The system of claim 8, wherein the evaluating performance parameters further includes identifying an entry in the one of the caches as least recently used (LRU), wherein repartitioning memory includes increasing the LRU of the one of the caches based on a rate of hits for the LRU.

10. The system according to claim 7, wherein the caches of the control module use prefetching based on offset values.

11. The system according to claim 7, wherein the filter mechanism comprises a bloom filter, the bloom filter enabling the write operations without accessing metadata on disk, the operations further comprising:
    evaluating false positive rates for the bloom filter; and
    adding memory to the bloom filter from one of the caches or moving memory from the bloom filter to one of the caches based on performance results corresponding to the evaluating, the moving including having the bloom filter for a superblock with more bits than a bloom filter for another superblock.

12. The system according to claim 11, wherein the bloom filter corresponds to the bucket associated with the bucket value, the bucket corresponding to a hash space, wherein the operations further comprise rebuilding the bloom filter when reaching a threshold of dirty entries.

13. A computer program product embodied on a non-transitory computer readable medium, the computer program product including instructions that, when executed by a computer, causes the computer to perform operations comprising:

evaluating performance parameters of caches of a control module of the multi-layer cache system, the caches of control module having two types of entries, wherein a first type of entry includes address, hash, and physical location values, and a second type of entry includes address-to-short-hash (A2SH) values;

evaluating performance parameters of caches of a data module of the multi-layer cache system, the data module receiving write requests from the control module and the caches of the data module having three types of entries;

predicting an effect that a modification to a size of one of the caches of the control module and the data module is on performance of operations at the multi-level cache based on results of the calculating the performance parameters of the caches of the control module and the caches of the data module; and upon estimating an increase in performance of one of the caches of the control module and the caches of the data module, repartitioning memory to increase allocation to the one of the caches and repartitioning memory to decrease allocation from another of the caches.

14. The computer program product of claim 13, wherein the performance parameters include a rate of hits estimated for an entry of the caches.

15. The computer program product of claim 13, wherein the evaluating performance parameters further includes identifying an entry in the one of the caches as least recently used (LRU), wherein repartitioning memory includes increasing the LRU of the one of the caches based on a rate of hits for the LRU.

16. The computer program product of claim 13, wherein the caches of the control module use prefetching based on offset values.

17. The computer program product according to claim 15, wherein the filter mechanism comprises a bloom filter, the bloom filter enabling the write operations without accessing metadata on disk, the operations further comprising:
    evaluating false positive rates for the bloom filter; and
    adding memory to the bloom filter from one of the caches or moving memory from the bloom filter to one of the caches based on performance results corresponding to the evaluating, the moving including having the bloom filter for a superblock with more bits than a bloom filter for another superblock.

18. The computer program product according to claim 17, wherein the bloom filter corresponds to the bucket associated with the bucket value, the bucket corresponding to a hash space, wherein the method further comprises rebuilding the bloom filter when reaching a threshold of dirty entries.

* * * * *